INVENTORS.
SAMUEL L. KEISER,
ROBERT Z. LANGEVIN
BY Thomas E. Schatzel
ATTORNEY

REFERENCE SIGNAL SERVO SYSTEM

Filed March 1, 1968 2 Sheets-Sheet 2

INVENTORS.
SAMUEL L. KEISER,
ROBERT Z. LANGEVIN
BY
ATTORNEY

United States Patent Office 3,495,152
Patented Feb. 10, 1970

3,495,152
REFERENCE SIGNAL SERVO SYSTEM

Samuel L. Keiser and Robert Z. Langevin, Los Gatos, Calif., assignors to Ampex Corporation, Redwood City, Calif., a corporation of California Filed Mar. 1, 1968, Ser. No. 709,546
Int. Cl. H02k 27/20
U.S. Cl. 318—314 13 Claims

ABSTRACT OF THE DISCLOSURE

A servo system for controlling the transducer head drum assembly or capstan of a tape recorder. The system includes a basic D.C. motor servo network comprising means receiving and comparing a first signal indicative of the actual condition of the head drum or capstan and a second signal from a secondary servo network receiving a periodic reference signal source. The secondary servo preserves the reference signal and removes undesirable jitter from the reference signal source. This allows the basic D.C. motor servo to be of high gain, fast response providing freedom from torque disturbances and fast stabilization while preventing reference signal jitter from disturbing the system. The secondary servo network may further include a clamp network such that the second signal, when no reference signal is present, is adequate to maintain drum rotation in a free-run condition.

BACKGROUND OF THE INVENTION

The present invention relates to a reference signal servo system, a preferred embodiment of which may be adapted for controlling the speed and position of a rotary transducer head assembly of a video tape recorder. The system provides speed and phase-locking of the head drum with reference pulses.

Although tape-to-head speed and relative phase are important in video tape recorders of the type wherein the transducing head is periodically out of operative relationship with the recording tape. This invention has found advantageous application in helical scan type video tape recorders. In such recorders, it is common to mount one or two magnetic heads on a rotary drum. The head or heads are rotated with the drum to transverse the tape once for each video field. Assuming a single head, during the record mode each rotation of the video head records one field plus the vertical sync pulse. When the head leaves the tape or is interrupted by a longitudinal track, no video signal is recorded. This absence of a signal is known as signal drop-out. In playback, the drop-out is a non-signal region on the ultimate picture. It is desirable that the drop-out occur at the beginning or end of a video field so as not to appear in the center of the picture, where it would be conspicuous. A convenient place for the drop-out is near the end of a video field just prior to the vertical synchronization interval; however, it must not occur during any portion of the vertical synchronizing pulse. With the recorder in its recording mode, the vertical synchronization signal may be used to synchronize the rotation of the head drum and place the head drum in the drop-out region just prior to a succeeding vertical synchronizing signal. During playback the synchronizing pulses may be derived from the vertical synchronization signals recorded on a longitudinal control track. The control track signals are reproduced and compared to the drum tachometer signals so that the head drum is servoed to the previous speed variations of the head drum during recording.

In controlling the drum, besides determining the phase error and locking the head drum is phase with the synchronizing pulses, it is also desirable to drive the head drum at the required speed before being locked in phase. Also, it is important that the drum speed pull into synchronism quickly. This is especially important in closed circuit video recorders where the record and playback modes are frequently interrupted. For example, in educational applications certain segments of the tape are replayed frequently at varying speeds. It is desirable that the transport settle down (lock-up) promptly when the mode is changed and that time base errors due to longitudinal tape flutter be minimized to prevent picture jitter. In playback, with closed circuit systems heretofore available it has been found that the control track sync reference has a four hertz or higher flutter frequency modulating its phase, which causes the playback picture to jitter. A prior art approach is to slow drum servo response to the neighborhood of one-half hertz to filter the jitter. This results in reduced servo gain and allows torque disturbances to produce picture jitter. It also results in a delay between the time of selecting playback and a stable picture.

SUMMARY OF THE INVENTION

The present invention provides a servo control system for driving a controllable head drum motor or capstan motor of a tape recorder. The system includes a basic servo network adapted to receive a pair of signals and provide an error signal responsive to the error between the two signals and to recognize when the head drum is not synchronized with a reference signal. The basic servo may include a signal comparator means, e.g., a forward-backward counter extending to a motor-driving amplifier. The comparator means receives a first periodic signal indicative of the actual condition of the drum, e.g., a tachometer signal, and a second periodic signal indicative of the desired condition of the drum. The second signal is received from a secondary servo network hereinafter referred to as the reference signal servo network. The phase relationship between the two signals determines the symmetry of the output rectangular wave from the comparator means and thus the excitation to the motor. The reference signal servo network, or secondary servo, is designed to have a response such that the out-put or second signal, synchronized with an input periodic reference signal, reduces or eliminates the time base errors in the reference signal.

The reference signal servo network receives and preserves the reference signal so as to reduce or eliminate time base errors in the reference signal. The reference signal is received at a phase comparator providing an output signal to a voltage-controlled oscillator. The phase comparator also receives a feedback signal from the oscillator with the comparator output error signal dependent upon the phase relationship of the reference and oscillator output. The oscillator output, which is an input signal to the basic servo, responds to a driving signal responsive to the output error signal and is thus instantaneously phase locked and synchronized with the reference. A clamping network may be included to maintain a desired oscillator output and clamp the voltage-controlled oscillator in a free-run, standby condition in the absence of a reference signal. The clamp may further include slow release means for slowly bringing the head drum into phase with the playback reference signal upon receipt of a playback signal following a standby or record mode of operation.

By preservoing the input reference signal from the control track through the electronic reference signal servo network which has relatively slow response to phase changes, the drum servo response can be fast even though the reference signal has appreciable time base errors within the pass band of the drum servo.

This system has proven to provide rapid stabilized pictures during random start and stop operations. The effects of tape flutter in the reference signal are smoothed out such that picture jitter is minimal. Torque disturbances result in minimal picture jitter because the main drum servo can be operated with high gain and extended frequency response. This becomes particularly important in low inertia drum systems where the only way to minimize torque disturbance is to extend the frequency response of the drum servo system.

DESCRIPTION OF PREFERRED EMBODIMENTS

Figures 1, 2:
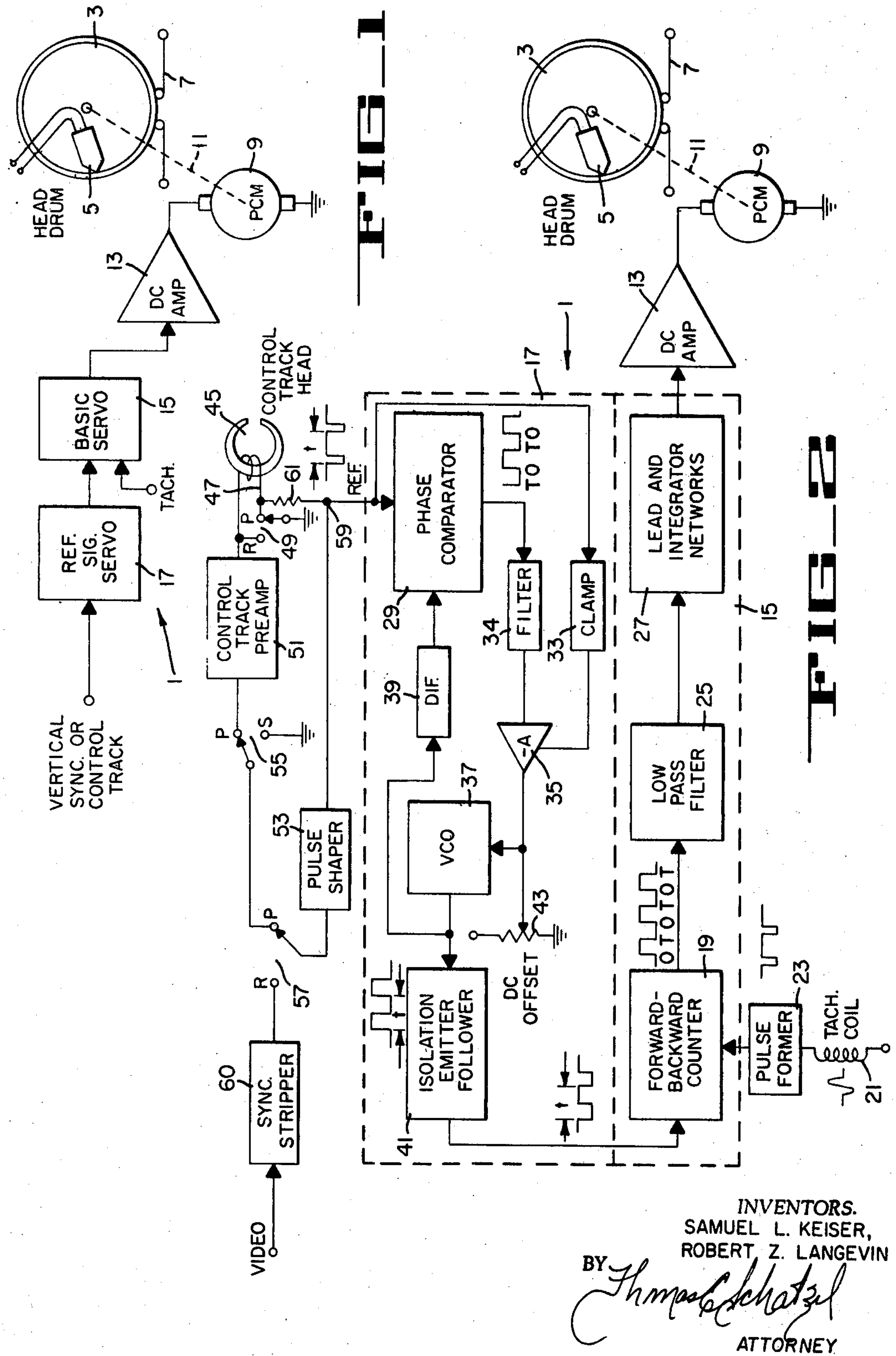
FIG. 1 is a simplified block diagram of the reference signal servo system of the present invention controlling a drive motor to a head drum of a video tape recorder.
FIG. 2 is a more detailed block diagram illustrating the individual stages of the system of FIG. 1.

In FIG. 1 the reference signal servo system of the present invention, referred to by the general reference character 1, is illustrated as incorporated for controlling a head drum 3 of a helical scan video tape recorder. The illustrated head drum 3 is a low inertia system including one magnetic transducer 5 adapted for laying down video tracks on a tape medium 7 illustrated as forming an Omega-wrap about the head drum 3. As is well known in the art, the tape 7 moves longitudinally as the drum 3 rotates with the head 5 scanning the tape 7 at an angle, generally in the order of a few degrees. For an illustrative system one may refer to United States Patent 3,333,-753 granted to John H. Streets and assigned to the assignee of the present invention. The drum 3 is coupled to a printed circuit motor 9 through a mechanical coupling 11. The rotational velocity of the motor depends upon the average D.C. excitation from a D.C. amplifier 13 controlled by the output signals of a basic servo network 15. The output of the basic servo network 15 depends upon the relationship of two input signals. A first input signal is representative of the actual condition of the motor 9 and the second is representative of the desired condition of the motor. The actual condition of the motor 9 may be indicated by a tachometer coupled to the motor. The output signal of the basic servo 15 to the D.C. amplifier 13 is thus an error signal representative of the difference between the actual and desired conditions of the motor 9 and head drum 3. The desired condition input signal to the basic servo 15 is delivered by a reference signal servo network 17. The reference signal servo network 17 receives reference pulses, e.g., vertical sync pulses, during the record mode or control track pulses during the playback mode. In either instance, the reference pulse may be in the order of fifty or sixty hertz dependent upon the field system standard. The reference signal servo network preservos the reference signal and delivers to the basic servo network 15 a signal synchronized with the standard.

Referring now to FIG. 2, the basic servo 15 and reference servo 17 are illustrated in more detail, with the various stages of each network included within the designated broken line blocks. First, the basic servo 15 incorporates a forward-backward counter or phase comparator network 19 receiving first and second pulse sources and producing an output signal representative of the phase relationship of the signals of the two sources. The illustrated first signal originates with a tachometer coil 21 tied to a pulse former network 23 extending to the counter. The second signal is from the reference servo 17. As illustrated by the output signal, the second signal places the counter 19 in a conductive condition and the first signal turns the counter off. The next pulse from the second signal turns the counter on again and the next pulse of the first signal turns the counter off. The output pulse waveform from the counter 19 is represented by the depicted rectangular waveform with the "O" and "T" designating the turning on and off by the signals from the reference signal servo network and the tachometer, respectively.

The output of the counter 19 is received by a low pass filter stage 25 removing the high frequency components. The signal is then received by a lead and integrator network 27 which provides the desired open loop gain and frequency response for a stable system. The signal is then amplified and fed to the printed circuit motor 9.

The illustrated secondary or reference signal servo network 17 includes a phase comparator 29 and a free-run clamp network 33 receiving a reference signal in the form of a vertical sync or control track signal having a time period *t*. The phase comparator 29 extends to a low-pass filter network 34. The filter 34 extends to an independent negative D.C. amplifier 35 which drives a voltage-controlled oscillator 37. The frequency of the voltage-controlled oscillator 37 depends upon the output voltage of the amplifier 35. The voltage-controlled oscillator 37 output extends to a differentiator network 39 back to the phase comparator 29, thus providing a closed loop network between the phase comparator 29 and voltage-controlled oscillator 37. As illustrated by the depicted waveform, the comparator 29 is alternately turned on and off by the oscillator 37 and reference signal. The output waveform from the comparator 29 is represented by the depicted rectangular waveform with the "T" and "O" designating the turning on and off by the reference signal and the oscillator signal. An isolation emitter follower 41 is also common to the oscillator 37 and provides a series of pulses representative of the oscillator output. The emitter follower 41 further aids in preventing disturbances of the oscillator 37 due to reflections from the counter 19. Thus, the second signal to the basic servo 15 is preservoed and synchronized with the incoming reference frequency.

In playback the reference signal is obtained from the tape control track and may have appreciable time base error created by the longitudinal tape flutter. This flutter, unless corrected or compensated for, results in jitter of the reproduced picture. In the present system, the tape flutter is corrected and compensated for by preservoing the reference signal before feeding it into the basic servo network 15 controlling the head drum 3. The reference signal servo network 17 smooths out the control track information and removes the jitter prior to its being fed into the basic servo 15. The average output of the phase comparator 29 is a function of the phase relationship between these two incoming signals and the frequency of the voltage-controlled oscillator 37 depends upon the output of the phase comparator 29. Thus, the frequency of the oscillator 37 coincides with the reference signal. When the playback mode is selected the transport is ready for instantaneous operation and it is not necessary to wait for the picture to settle down, as the phase locking is done slowly so as not to adversely disturb the drum velocity.

The clamp network 33 serves its function when the transport is in standby and there is no incoming reference signal. Without the clamp network 33 and no reference signal the output from the voltage-controlled oscillator 37 would be slow and consequently the drum would rotate slowly in relationship to the normal velocity. The clamp network 33 provides a continuous D.C. voltage to the oscillator 37 to maintain a second signal to the basic servo 15 at the desired reference frequency. In the absence of a reference signal, the oscillator is clamped to the standby driving signal. Thus, the drum 3 maintains a desired rotational velocity and when the transport is switched out of standby the head drum is in condition for operation. In essence, when there is no reference signal present the clamp network clamps the output of the D.C. amplifier to the proper voltage for maintaining the voltage-controlled oscillator at the desired frequency and the drum 3 at a desired free-run speed. A D.C. offset source 43 may be incorporated and adjusted to provide the desired input to the voltage-controlled oscillator for maintaining the desired standby, free-run rate. Also the clamp 33 may include a ramp generator such that when in the record or playback mode and there is an absence of more than one reference pulse, the clamp will be actuated until reference pulses return.

The reference signal to the phase comparator may be generated in any of various ways depending on the application. For example, in FIG. 2 and assuming that the transport is in the playback mode, a control track head 45 senses the control track on the tape medium 7. A sensing coil 47 of the head extends across a switch 49, having two positions designated "R" and "P" for record and playback, respectively. The rotating arm of the switch extends to ground reference. In the playback mode, the switch position "P" is common to ground and the other side of the coil 47 joins a control track preamp 51, and a pulse shaper 53 to form the desired reference pulses responsive to the control track signal. Intermediate the preamp 51 and the shaper 53 are a pair of two-position switches 55 and 57 which are incorporated for selection of the desired mode of operation. The switch 55 has a playback and standby position "P" and "S," respectively, while the switch 57 has a record and playback position "R" and "P," respectively. The output of the pulse shaper 53 is tied to a junction 59 common to the input of the phase comparator 29 of the reference signal servo network 17 so that in the playback mode a control track signal serves as the incoming reference signal. In either the standby or record modes the preamp 51 and pulse shaper 53 are disconnected from each other.

In the record mode, the switches 49 and 57 are at "R" position and the control track head 45 is switched to record the vertical sync pulses onto the tape 7. In this mode, the composite video incoming signal is fed through a sync stripper network 60 whereby the video information is stripped. The sync signal is fed through the pulse shaper 53 and received at the junction 59 common to the input of the phase comparator 29 and through a resistor 61 to the coil 47.

Figure 3:
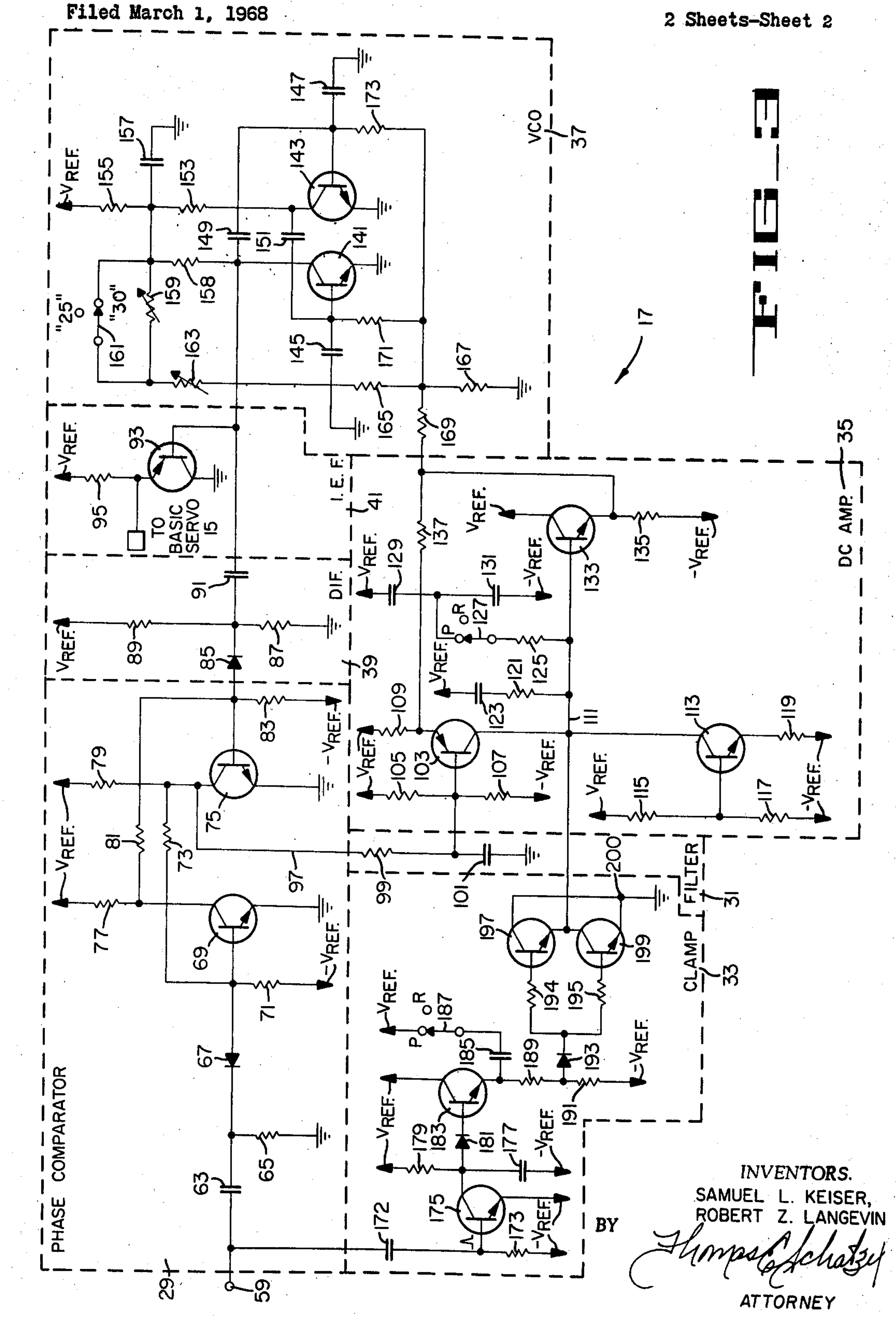
FIG. 3 is a circuit diagram of the reference signal servo network of the system of FIGS. 1 and 2.

FIG. 3 illustrates a preferred circuit diagram of the secondary or reference signal servo network 17 with the various individual networks of FIG. 2 indicated within broken line blocks carrying the same reference numerals. In the embodiment both the clamp network 33 and the phase comparator 29 receive the periodic reference signal source at the input terminal means 59. The comparator 29 includes a resistance-capacitance coupling of a small blocking capacitor 63 and resistor 65 tied to the cathode of a blocking diode 67. The base of a NPN transistor 69 also extends to the negative side of a voltage reference source through a biasing resistance 71 and through a resistance 73 to the collector of a second NPN transistor 75. The emitters of both transistors 69 and 75 are grounded. The collectors of each transistor 69 and 75 extend through collector bias resistors 77 and 79, respectively, to the positive side of the voltage reference source. The collector of the transistor 69 further extends through a resistance 81 to the base of the transistor 75 and to a bias resistance 83 joining the negative side of the reference source.

A second input to the phase comparator 29 is received through a blocking diode 85, the cathode of which extends to the differentiator network 39. The differentiator network 39 includes a voltage divider comprising a resistor 87 tied to ground and a second resistor 89 tied to the positive voltage reference source. The diode 85 and voltage divider are joined in common with a small blocking capacitor 91 the other side of which is common to the isolation emitter follower network 41 and voltage-controlled oscillator 37.

The illustrated isolation emitter follower 41 includes a PNP transistor 93 with the base tied to the capacitor 91 and the collector grounded. The emitter extends through a bias resistor 95 to the voltage reference source and to the basic servo 15.

The output of the phase comparator network 29 extends to the low-pass filter circuitry 34 through a lead 97 extending from the collector of the transistor 75. The filter circuitry 34 comprises a series resistance 99 and capacitance 101 network which is designed to provide a small sawtooth wave of a frequency coinciding with that of the reference source to the phase comparator 29.

The junction of the resistor 99 and capacitor 101 of the filter 31 is tied to the base of a PNP transistor 103 which is part of the negative D.C. amplifier network 35. The illustrated embodiment of the amplifier network 35 may be viewed as being a high gain amplifier or an amplifier-integrator network. The base of the transistor 103 is tied to a voltage divider having a resistor 105 tied to the positive reference voltage source and a resistor 107 tied to the negative reference source. The emitter of the transistor 103 extends to the positive voltage reference source through a bias resistance 109. The collector of the transistor 103 is tied to a common junction line 111. Also tied to the junction 111 is the collector of a NPN transistor 113, the base of which is tied to a voltage divider with a resistance 115 extending to the positive voltage reference source and a resistance 117 tied to the negative reference source. The emitter of the transistor 113 is tied to the negative reference source through a resistance 119.

The common line 111 extends to the positive reference source through the series combination of a resistance 121 and a capacitor 123. Also, the common point is tied to a resistance 125 and to a two position switch 127, with the positions designated "P" and "R" for playback and record modes, respectively. The switch 127 when in the "P" position ties in a capacitor network having a capacitor 129 extending to the positive reference source and a capacitor 131 extending to the negative reference source. When the switch is in the "R" position, the capacitors 129 and 131 are switched out of the network as is the resistance 125. This in effect changes the gain of the amplifier between the record and playback modes. Where dropouts are dependent upon the phase of the servo, as in the present embodiments, it is desirable to get the dropout in proper position as soon as possible. Thus, the gain or rate of the reference signal servo network 17 is changed between the play and record modes. The common point 111 is also tied to the base of an emitter follower transistor 133, the collector of which is tied to the positive reference source and the emitter of which is tied through a resistance 135 to the negative reference source. The combination of the emitter follower and the network of the resistor 121, capacitor 123, resistor 125, switch 127, capacitor 129 and capacitor 131 provides an integrating and gain operation selective between the two modes. The emitter of the transistor 133 extends to the input of the voltage-controlled oscillator 37. The emitter of the transistor 103 also extends to the emitter of the transistor 103 through a high value resistance 137.

The illustrated voltage-controlled oscillator 37 includes a pair of grounded-emitter, NPN transistors 141 and 143. The bases of the transistors 141 and 143 each extend to ground through a small valued capacitor 145 and 147, respectively. The collector of the transistor 141 is tied through a capacitor 149 to the base of the transistor 143. The collector of the transistor 143 is tied to the base of the transistor 141 through a capacitor 151 and through a resistance network comprising a pair of resistors 153 and 155 to the positive voltage reference source. The junction of the resistors 153 and 155 extends to ground through a capacitor 157 and to the collector of the transistor 141 through a collector resistor 158. The D.C. offset network 43, which is shown separately in FIG. 2, may be realized from within the oscillator stage 37.

The collector of the transistor 141 extends to a variable resistance 159 which is in parallel with a frame-rate switch 161 having two positions designated "25" and "30," respectively, and selected according to whether a 25 frame per second or 30 frame per second signal system is utilized. The switch 161 is also tied to a second variable resistor 163 extending through a resistor 165 to the input of the voltage-controlled oscillator common to the junction of a bias resistor 167 extending to ground, an input resistor 169, a base bias resistor 171 to the transistor 141 and to a base bias resistor 173 to the transistor 143. Accordingly, for standby operation, the switch 161 is set in one of the two positions depending on the field involved. The resistors 159 and 163 are variable so that the precise speed may be selected. The output of the oscillator network 37 to the isolation emitter follower 41 is taken at the junction of the capacitor 149 and resistor 158.

The clamp network 33 in FIG. 3 is illustrated as tied to the reference junction 59 receiving the vertical sync or control track reference signals. The reference signal is sensed by a series network of a capacitance 172 and a resistance 173 extending to the negative reference source. The junction of the resistor 173 and capacitor 172 is common to a NPN transistor 175. The values of the capacitor 172 and resistor 173 are selected to change the rectangular reference pulse to a spike. The emitter of the transistor 175 extends to the negative reference source. The collector of the transistor 175 extends to the negative reference source through a ramp generating capacitor 177 and to the positive reference source through a resistance 179. The transistor stage 175 serves as a sawtooth generator with the values of the resistor 179 and capacitor 177 reflected in the shape of the sawtooth. The collector of the transistor 175 joins the anode of a blocking diode 181 with the cathode tied to the base of an NPN transistor 183 of a current amplifier. The blocking diode is included for protection of the transistor 175 against reverse emitter-base voltage fluctuations of the transistor 183. The collector of the transistor 183 extends to the positive reference source while the emitter is tied to a capacitance 185 extending to a two-position switch 187 having "P" and "R" positions. The "P" terminal extends to the positive reference source and the "R" position is open. The emitter further extends to the negative reference source through a large resistance, comprising two resistors 189 and 191, preferably having a resistance rating ratio in the order of 1:10. The junction of the resistors 189 and 191 is common to the anode of a blocking diode 193, the cathode of which is tied to the junction of a pair of parallel resistors 194 and 195 each extending to the base of a respective NPN transistor 197 and 199. The transistors 197 and 199 are connected in series with the collectors tied to the emitters. The collector of the transistor 197 and emitter of the transistor 199 are tied at a threshold reference potential point 200, illustrated as ground potential. The clamp network 33 of FIG. 3 is so designed that transistors 197 and 199 conduct when there is no reference signal and provide a free-run signal to the independent amplifier 35. In the absence of a reference signal, the transistor 175 is cut off, allowing the capacitor 177 to charge toward V ref.; in turn, allowing the transistor 183 to conduct. The voltage at the junction of the resistors 189 and 191 rises, allowing the transistors 197 and 199 to conduct. As soon as a reference signal is received from the junction 59, the transistor 175 conducts, discharging the capacitor 177. Thus, the transistor 183 is cut off. With the switch 187 in "R" position, the transistors 197 and 199 are prevented from conducting. Two clamping transistors 197 and 199 are preferable, since the point desired to be clamped, junction 111, may be either positive or negative with respect to ground. Since it is common for transistors to have different beta values for forward and reverse conduction conditions, the parallel connection of two transistors assures comparable amplification for both positive and negative currents.

In playback, it is desirable to bring the phase of the head drum 3 to coincide with the control track at a slow rate, e.g., 1–2 seconds. Otherwise, if the rate is too rapid, there is a rapid correction in drum position and the drum velocity increases whereas a slow release results in a lower increase in drum velocity. If the drum velocity exceeds the desired value, e.g., 3600 r.p.m., the picture information is sent to the monitor at a high rate and the monitor horizontal oscillator has difficulty in tracking. Consequently, the picture shifts across the screen. By keeping the change in drum velocity small during the phase correction period, the monitor can follow the change with minimal picture shift. The clamp network 33 of FIG. 3 serves favorably as a slow release clamp when the playback mode is selected and an instantaneous release when the record mode is selected. As previously mentioned, during standby the ramp generating capacitor 177 charges during standby and rapidly discharges upon receipt of a reference pulse. To overcome the rapid discharge upon switching to the playback mode, the capacitor 185 and resistor 189 form a resistance-capacitance charge network of a desired time constant when in the playback mode. The capacitor, prior to receipt of a reference pulse, charges to the V reference value. Upon receipt of a reference pulse, the time constant of the capacitor 185 and resistor 189 prolongs the time before the transistors 197 and 199 take a full non-conductive state. In the record mode the slow release is not desirable as in the playback mode. Thus, when record mode is selected the capacitor 185 and slow release are switched out such that the clamp is released upon receipt of the first reference pulse.

We claim:

1. A reference signal servo system, comprising in combination:

a controllable driving means for driving a member in a desired manner, the condition of the driving means being dependent upon applied electrical excitation;

a basic servo network controlling the excitation to the driving means, the basic servo network receiving a first signal indicative of the actual condition of the member and a second signal obtained from a secondary servo loop indicating the desired condition of the member, the basic servo controlling the applied excitation responsive to the error between the first and second signals; and a secondary servo network means receiving a periodic reference signal source indicative of the desired condition and providing the second signal synchronous with the reference signal, the secondary servo loop having a response to reduce time base errors in the reference signals.

2. The servo system of claim 1, in which the secondary servo network includes a voltage-controlled oscillator extending to the basic servo and a phase comparator receiving the reference signal, the oscillator and comparator forming a closed loop with the comparator receiving a feedback signal representative of the condition of the oscillator and the comparator providing an output error signal responsive to the phase relationship between the reference and feedback signals, said oscillator receiving a driving signal responsive to the output error signal.

3. The servo system of claim 2 further including a clamping means maintaining a standby driving signal to the oscillator in the absence of a reference signal.

4. The servo system of claim 3 in which the clamping means includes a ramp generator responsive to the signal from said comparator, and amplifying means responsive to the ramp signal, the output pulses of said ramp generator responsive to alternate reference signals and the amplifying means providing an output signal responsive to ramp pulses exceeding a predetermined value, said clamp further including slow release means for gradually changing the status of the amplifying means from a conductive to a non-conductive status.

5. The servo system of claim 4 in which the slow release means includes a charge circuit having a predetermining time constant and a discharge path responsive to the amplifying means, said charge circuit being in an instantaneous charge status and discharging during the change in status of the amplifying means, whereby the control signal to the amplifying means decreases responsive to the time constant.

6. The servo system of claim 2 including a low pass filter and amplifier means receiving the output error signal of the comparator and providing a direct current driving signal to the oscillator the amplitude of which is dependent upon the error signal.

7. In a servo system for synchronizing the rotary drum of a rotary head video tape recorder with a reference signal comprising a direct current motor driving a rotary drum engaging a magnetic tape and carrying a video transducer transversely scanning the tape, and a basic servo network controlling the excitation to the motor in accordance with an error signal responsive to the error between first and second input signals, respectively, indicative of the actual and desired position of said drum, the combination with a secondary servo delivering the second input signal, the secondary servo receiving and preserving a reference signal representative of the desired drum position, the secondary servo including a voltage controlled oscillator means extending to the basic servo and a phase comparator receiving the reference signal, the oscillator and comparator forming a closed loop with the comparator receiving a feedback signal representative of the condition of the oscillator, said comparator providing an output error signal responsive to the phase relationship between the reference and feedback signals and said oscillator receiving a driving signal responsive to the output error signal.

8. The servo system of claim 7 in which during the playback mode of the recorder the periodic reference signal to the secondary servo coincides with a control track prerecorded on the tape medium in accordance with the vertical sync pulse rate of a recorded signal and during the record mode of the recorder the reference signal coincides with the vertical sync pulse rate of the video signal to be recorded.

9. The servo system of claim 8 further including a clamping means maintaining a standby driving signal to the oscillator in the absence of a reference signal.

10. The servo system of claim 9 in which the clamping means includes a slow charge circuit release means, said charge circuit discharging upon initially selecting the playback mode and slowly decreasing the standby driving signal.

11. The servo system of claim 10 further including switching means placing the slow release means in the clamping means during playback and inactivating the release means during the record mode.

12. The servo system of claim 9 further including a low pass filter and independent amplifying means intermediate the comparator and oscillator, the filter receiving the error signal from the comparator, the output of the clamping means being common to the independent amplifying means and providing a free-run signal in the absence of an error signal.

13. The servo system of claim 12 in which the clamping means includes a ramp generator being reset by the reference signal pulses, the ramp generator pulses in turn controlling the conductive state of the clamping means and the standby driving signal.

References Cited

UNITED STATES PATENTS

| | | | |
|---|---|---|---|
| 2,803,792 | 8/1957 | Turner | 318—314 |
| 3,064,173 | 11/1962 | Breen et al. | 318—329 |
| 3,174,090 | 3/1965 | Hall | 318—318 |
| 3,268,788 | 8/1966 | Branco | 318—314 |
| 3,277,236 | 10/1966 | Machein et al. | 318—314 |
| 3,356,921 | 12/1967 | Bradford et al. | 318—314 |
| 3,395,326 | 7/1968 | Hebb | 318—318 |
| 3,399,334 | 8/1968 | MacLeod | 318—329 |
| 3,424,966 | 1/1969 | Webb | 318—314 |

ORIS L. RADER, Primary Examiner

L. L. HEWITT, Assistant Examiner

U.S. Cl. X.R.

318—318, 327, 239